US012567191B2

(12) United States Patent
Brendel et al.

(10) Patent No.: US 12,567,191 B2
(45) Date of Patent: Mar. 3, 2026

(54) PROJECTION-DOMAIN MATERIAL DECOMPOSITION FOR SPECTRAL IMAGING

(71) Applicant: KONINKLIJKE PHILIPS N.V., Eindhoven (NL)

(72) Inventors: Bernhard Johannes Brendel, Norderstedt (DE); Klaus Alfred Erhard, Hamburg (DE); Claas Bontus, Hamburg (DE); Artur Sossin, Hamburg (DE); Axel Thran, Hamburg (DE); Heiner Daerr, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 380 days.

(21) Appl. No.: 18/276,902

(22) PCT Filed: Feb. 15, 2022

(86) PCT No.: PCT/EP2022/053664
§ 371 (c)(1),
(2) Date: Aug. 11, 2023

(87) PCT Pub. No.: WO2022/175259
PCT Pub. Date: Aug. 25, 2022

(65) Prior Publication Data
US 2024/0127500 A1 Apr. 18, 2024

(30) Foreign Application Priority Data
Feb. 19, 2021 (EP) .................................... 21158178

(51) Int. Cl.
*G06T 11/00* (2006.01)
*G06T 5/50* (2006.01)
*G06T 5/70* (2024.01)

(52) U.S. Cl.
CPC .............. *G06T 11/006* (2013.01); *G06T 5/50* (2013.01); *G06T 5/70* (2024.01); *G06T 2211/408* (2013.01)

(58) Field of Classification Search
None
See application file for complete search history.

(56) References Cited

U.S. PATENT DOCUMENTS

2016/0287205 A1* 10/2016 Zou ...................... A61B 6/4266
2018/0235562 A1* 8/2018 Petschke .............. A61B 6/4241
(Continued)

FOREIGN PATENT DOCUMENTS

WO WO2016097981 A1 6/2016

OTHER PUBLICATIONS

PCT International Search Report, International application No. PCT/EP2022/053664, Jul. 5, 2022.
(Continued)

*Primary Examiner* — David Ometz
(74) *Attorney, Agent, or Firm* — Larry Liberchuk

(57) ABSTRACT

The present invention relates to a method (1), resp. a device, system and computer-program product, for material decomposition of spectral imaging projection data. The method comprises receiving (2) projection data acquired by a spectral imaging system and reducing (3) noise in the projection data by combining corresponding spectral values for different projection rays to obtain noise-reduced projection data. The method comprises applying (6) a first projection-domain material decomposition algorithm to the noise-reduced projection data to obtain a first set of material path length estimates, and applying (7) a second projection-domain material decomposition algorithm to the projection data to obtain a second set of material path length estimates. The second projection-domain material decomposition algo-
(Continued)

rithm comprises an optimization that penalizes a deviation between the second set of material path length estimates being optimized and the first set of material path length estimates.

14 Claims, 6 Drawing Sheets

(56) References Cited

U.S. PATENT DOCUMENTS

2019/0164317 A1* 5/2019 Tang .................... A61B 6/5205
2021/0372951 A1* 12/2021 Ramani ................ G01N 23/046

OTHER PUBLICATIONS

Ducros N. et al., "Regularization of Nonlinear Decomposition of Spectral X-Ray Projection Images", Medical Physics Wiley USA, vol. 44, No. 9, Sep. 2017 (Sep. 2017), pp. e174-e187, XP055824598.
Liu H. et al., "Reconstruction Algorithms for Spectral Computed Tomography", Master Thesis, Oct. 10, 2018 (Oct. 10, 2018), XP055824622. Retrieved from the Internet: URL:https://dspace.library.uu.nl/bitstream/handle/1874/371447/Thesis_Hanna.pdf?sequence=2 [retrieved on Jul. 15, 2021] p. 32-p. 38.
Renaut R.A. et al., "Efficient Estimation of Regularization Parameters via Downsampling and the Singular Value Expansion", BIT Numerical Mathematics, vol. 57, Issue 2, pp. 499-529, 2017.
Horst M. et al., "Applying the x2 Regularization Parameter Estimator by Downsampling Through Relations with The Singular Value Expansion", arXiv:1311.0398, 2013.
Persson M. et al., "Bias-Variance Tradeoff in Anticorrelated Noise Reduction for Spectral CT", Medical Physics, vol. 44, Issue 9, pp. e242-e54, Sep. 2017.

* cited by examiner

PROJECTION-DOMAIN MATERIAL DECOMPOSITION FOR SPECTRAL IMAGING

FIELD OF THE INVENTION

The present invention relates to the field of spectral imaging in computed tomography, and, more specifically, the invention relates to methods and means for performing a material decomposition in spectral computed tomography (CT).

BACKGROUND OF THE INVENTION

In spectral CT, multiple projection data sets are obtained for different X-ray spectra such that the attenuation properties of materials constituting a scanned object can be differentiated for different X-ray energies. This can be achieved by various means, such as using different X-ray tubes, switching a tube between different peak energies (kVp), and/or detectors specifically designed to discern different energies (or at least with different sensitivities for different energy ranges). Examples of such detectors include multi-layered detectors (e.g. dual layer detectors) and photon counting detectors.

Different parameters of interest can be determined, in a process generally referred to as material decomposition, from the acquired data, such as to form images representing local differences in photon interactions due to the photo-electric effect and due to Compton scattering, and/or the local presence and/or density of specific materials, such as water, bone and iodine contrast agent. Thus, spectral CT offers the advantage of enabling a differentiation of materials in the scanned object The spectral CT data can thus be used to generate material volumetric images (representing a specific material in isolation from the other material content in the scanned image), e.g. bone (calcium) images, soft tissue (water) images, but also maps of the concentration of a iodine contrast agent injected into a patient being imaged, etc. It is also possible to construct "virtual" monochromatic images (representing attenuation for one specific photon energy), to combine the decomposition of different material images back into a conventional CT image (a non-spectral image), or a virtual non-contrast image, which is representative of a conventional CT image acquired in the absence of the iodine contrast agent. The latter is clearly particularly advantageous, since it allows a comparison between a contrast-enhanced state and a non-contrast-enhanced state of the scanned subject without necessitating a separate acquisition of two scans, with and without contrast agent, which could imply an additional radiation dose delivered to the patient and possibly undesirable deformation and/or displacement of image features between the two images.

For example, the detector readings of a measurement, e.g. corresponding to one detector pixel and one projection, that represent different X-ray energies (or spectra) can be converted into material path lengths (material line integrals along the projection ray), which can then be reconstructed with conventional tomographic reconstruction techniques (e.g. filtered back-projection) to generate material-specific images, e.g. to generate volumetric image data specific to the material component of interest and/or further types of images as explained hereinabove. While alternatively a material decomposition can be performed in the image domain, e.g. after a tomographic reconstruction step, the aforementioned approach is referred to as material decomposition in the projection domain.

Unfortunately, this material decomposition in the projection domain is a mathematically very ill-posed task, i.e. an ill-posed non-linear problem. Therefore, the signal-to-noise ratio of the material path length data, on which a further tomographic reconstruction is performed, can be much lower than that of the native detector readings. This noise amplification can lead to extreme values (outliers) in the estimated material path length values, e.g. in scenarios where substantial noise was already present in some of the detector readings. These outliers can lead to strong streak artifacts in the reconstructed material images. The enhanced noise and the streak artefacts can, unfortunately, severely degrade the image quality, e.g. reducing the clinical value of the material volumetric image data obtained for diagnostic evaluation of patients.

One approach known in the art to reduce extreme output values for optimization-based material decomposition estimators is to apply a Tikhonov regularization, in which a regularization term is added to the cost function being optimized by the estimator to penalize the squared output values. Thus, strong outliers are avoided or at least reduced by preferentially selecting solutions of the optimization problem that have a lower norm of the output value, e.g. the material path length.

Even though a Tikhonov regularization can reduce outliers very efficiently, it also tends to force all output values of the estimator to smaller values, even if they are not outliers. Thus, a risk exists that the Tikhonov regularization systematically distorts the estimated material path length values, leading to quantitatively unrepresentative material images. This effect of systematically distorted output values due to regularization is known as regularization induced bias, i.e. a shift toward zero of the mean of the material line integrals, which can vary over the sinogram. In the tomographic reconstructions generated from this biased data, this bias can become apparent as quantitatively incorrect iodine concentration estimations, visible image artifacts in virtual monochromatic images, and/or other inaccuracies.

It is known in the art to apply a denoising algorithm to alleviate this problem. However, this comes at an additional cost of computational resources and yet may typically not achieve a sufficient or complete removal of the regularization bias. Therefore, a need exists in the field for an approach to further reduce the noise and the regularization-associated bias in projection-domain material decomposition algorithms.

For example, WO 2016/097981 A1 illustrates a method as known in the art, in which the measured line integrals are concurrently decomposed and denoised during the material decomposition, which includes an integrated denoising algorithm.

SUMMARY OF THE INVENTION

It is an object of embodiments of the present invention to provide in a good and/or efficient material decomposition in the projection domain of spectral (multi-energy) computed tomography (CT) data.

It is an advantage of embodiments of the present invention that an approach is provided to reduce noise (e.g. reduce noise magnification) in the material path lengths calculated by a projection-domain material decomposition algorithm for CT that relies on numerically solving an ill-posed problem.

It is an advantage of embodiments of the present invention that a material decomposition approach is provided to reduce and/or prevent outliers (extreme values) in the calculated material path lengths, e.g. while simultaneously reducing noise by regularization.

It is an advantage of embodiments of the present invention that noise and/or noise induced bias can be reduced or prevented in material composition in the projection domain, e.g. without processing the projection and/or image data using a specific denoising algorithm. In other words, denoising and material decomposition can be simultaneously, efficiently and effectively achieved.

It is an advantage of embodiments of the present invention that a material decomposition approach is provided with results having reduced levels of noise (magnification) and/or outliers compared to prior-art algorithms, while being efficient and/or less demanding on computational resources, such as processing power, memory requirements and/or processing time.

It is an advantage of embodiments of the present invention that a material decomposition approach is provided that uses a regularization, of the material decomposition problem in the projection domain, that is similar to Tikhonov regularization, yet can provide superior results in terms of regularization induced bias. Therefore, a method (resp. device, computer-program product) in accordance with embodiments can be easily implemented starting from algorithms and their implementations as known in the art.

It is an advantage of embodiments of the present invention that a material decomposition approach is provided that uses a multi-step approach to solving the projection-domain material decomposition problem. While this seemingly may increase the complexity with respect to a conventional single-step approach, the additional initial step or steps, e.g. performed at a lower resolution, may be implemented in substantially the same manner as the final step, e.g. requiring little additional effort in implementation, and may be substantially less demanding on processing resources, e.g. due to a lower resolution (for example, the complexity of solving the problem and the associated memory requirements may typically scale at least linearly with number of data points considered).

It is an advantage of embodiments of the present invention that a quantitative bias in images derived from spectral CT data can be avoided and/or reduced, e.g. such that pixel/voxel values in the derived images can be used for quantitatively correct measurements.

It is an advantage of embodiments of the present invention that streaking artefacts in images derived from spectral CT data can be avoided and/or reduced.

It is an advantage of embodiments of the present invention that a solution for reducing noise, outliers and/or regularization bias in projection-domain material composition is provided that is simple, efficient and/or effective.

A device, method, system and/or computer-program product in accordance with embodiments of the present invention achieves the above objective.

In a first aspect, the present invention relates to a method for material decomposition of spectral imaging projection data. The method comprises receiving projection data acquired by a spectral imaging system, reducing noise in the projection data by combining corresponding spectral values for different projection rays to obtain noise-reduced projection data, applying a first projection-domain material decomposition algorithm to the noise-reduced projection data to obtain a first set of material path length estimates, and applying a second projection-domain material decomposition algorithm to the projection data to obtain a second set of material path length estimates. The second projection-domain material decomposition algorithm comprises an optimization that penalizes a deviation between the second set of material path length estimates being optimized and the first set of material path length estimates.

In a method in accordance with embodiments of the present invention, the first projection-domain material decomposition algorithm may comprise an optimization that minimizes a deviation between the noise-reduced projection data and a forward estimate thereof based on the first set of material path length estimates being optimized.

In a method in accordance with embodiments of the present invention, the optimization of the first projection-domain material decomposition algorithm may further comprise a Tikhonov regularization of the first set of material path length estimates being optimized.

In a method in accordance with embodiments of the present invention, the optimization of the second projection-domain material decomposition algorithm may minimize a deviation between the projection data and a forward estimate thereof based on the second set of material path length estimates being optimized.

In a method in accordance with embodiments of the present invention, the penalization in the optimization of the second projection-domain material decomposition algorithm may comprise a modified Tikhonov regularization of the form $\sum_m \beta_m \cdot |l_{im} - \hat{l}_{im}|^n$, where m iterates over the number of base-materials of the material decomposition, $\beta_m$ refers to predetermined weight parameters assigned to the respective base-materials, i identifies the projection ray for which the material decomposition is being determined by the optimization, $l_{im}$ refers to the material path length of the i'th projection ray and the m'th base-material in the second set of material path length estimates being optimized, $\hat{l}_{im}$ refers to the material path length of the i'th projection ray and the m'th base-material as determined by the first set of material path length estimates and n is a predetermined non-zero parameter.

In a method in accordance with embodiments of the present invention, the parameter n may be a real positive number greater than or equal to 1. For example, n may be an positive integer, e.g. 1, 2, 3, 4, or greater than 4, but rational and/or real values, e.g. in the sense of a generic p-norm ($\ell_p$ norm), are not necessarily excluded.

In a method in accordance with embodiments of the present invention, a cost function of the optimization of the second projection-domain material decomposition algorithm may have the form $\sum_b \hat{p}_{ib}(l_{im}) - p_{ib} \log(\hat{p}_{ib}(l_{im})) + \sum_m \beta_m \cdot |l_{im} - \hat{l}_{im}|^n$, in which $p_{ib}$ refers to the projection data of the i'th projection ray and the b'th spectrum or energy bin and $\hat{p}_{ib}(l_{im})$ to a corresponding forward estimate thereof based on the second set of material path length estimates being optimized.

In a method in accordance with embodiments of the present invention, reducing the noise may comprise a low-pass spatial filtering and/or smoothing of the projection data.

In a method in accordance with embodiments of the present invention, the low-pass spatial filtering and/or smoothing of the projection data may comprise applying a boxcar filter.

In a method in accordance with embodiments of the present invention, reducing the noise may comprise down-sampling the projection data.

A method in accordance with embodiments of the present invention may comprise up-sampling and/or interpolating the first set of path length estimates to the same spatial resolution as the projection data for use in the second material decomposition algorithm.

A method in accordance with embodiments of the present invention may comprise a further step of reducing noise in the projection data by combining corresponding spectral values for different projection rays to obtain further noise-reduced projection data, and a further step of applying a further projection-domain material decomposition algorithm to the further noise-reduced projection data to obtain a further set of material path length estimates. The step of applying the first projection-domain material decomposition algorithm may comprise an optimization that penalizes a deviation between the first set of material path length estimates being optimized and the further set of material path length estimates.

In a method in accordance with embodiments of the present invention, receiving the projection data may comprise receiving projection data that has been acquired by a spectral computed tomography imaging system, wherein the projection data comprises, for each of a plurality of different geometric projection rays, a plurality of spectral values corresponding to different X-ray spectra or X-ray energy bins.

In a second aspect, the present invention relates to a projection data processing device for material decomposition of spectral imaging projection data. The device comprises an input for receiving the projection data acquired by a spectral imaging system, a noise reducer for reducing noise in the projection data by combining corresponding spectral values for different projection rays to obtain noise-reduced projection data, a first optimizer to apply a first projection-domain material decomposition algorithm to the noise-reduced projection data and thus obtain a first set of material path length estimates, and a second optimizer to apply a second projection-domain material decomposition algorithm to the projection data to obtain a second set of material path length estimates. The second projection-domain material decomposition algorithm comprises an optimization that penalizes a deviation between the second set of material path length estimates being optimized and the first set of material path length estimates.

In a third aspect, the present invention relates to a spectral computed tomography imaging system comprising a projection data processing device in accordance with embodiments of the second aspect of the present invention.

In a fourth aspect, the present invention relates to a computer-program product comprising computer-executable instructions, which, when executed on a programmable device, performs a method in accordance with embodiments of the first aspect of the present invention.

The independent and dependent claims describe specific and preferred features of the invention. Features of the dependent claims can be combined with features of the independent claims and with features of other dependent claims as deemed appropriate, and not necessarily only as explicitly stated in the claims.

Figure 1:
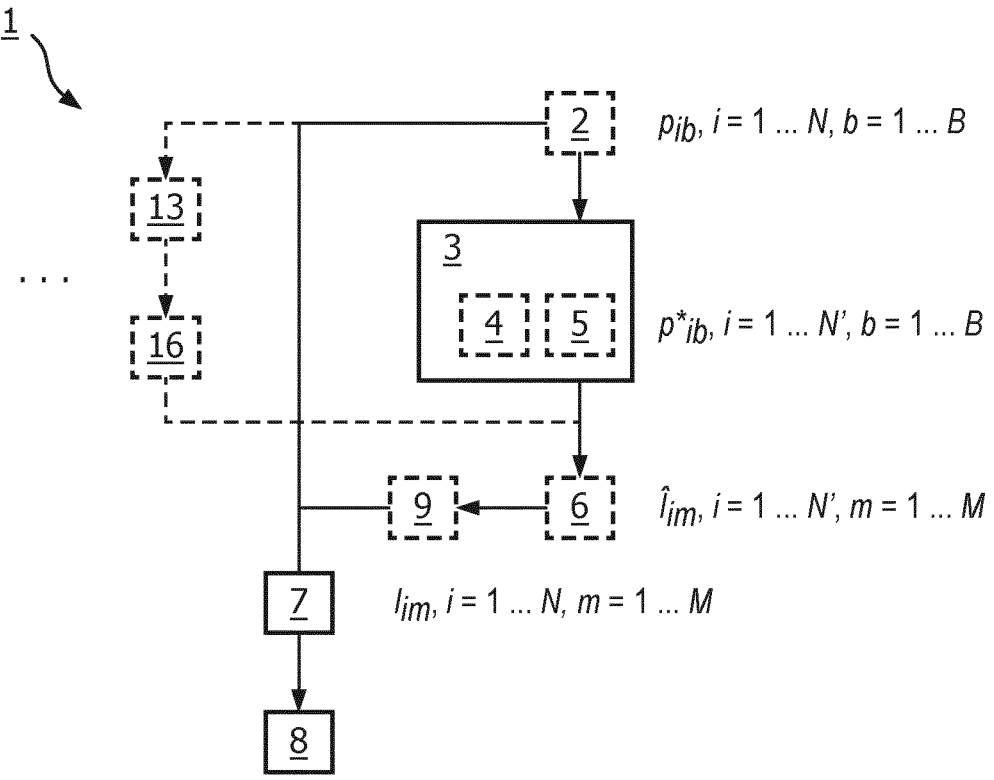
FIG. 1 shows a method in accordance with embodiments of the present invention.

The drawings are schematic and not limiting. Elements in the drawings are not necessarily represented on scale. The present invention is not necessarily limited to the specific embodiments of the present invention as shown in the drawings.

DETAILED DESCRIPTION OF EMBODIMENTS

In a first aspect, the present invention relates to a method for material decomposition of projection data obtained in spectral imaging, e.g. spectral (e.g. multi-energy, e.g. dual energy) computed tomography (CT) imaging. Particularly, the method may be a computer-implemented method, e.g. an automatic or semi-automatic procedure executed by a suitable processor, e.g. on a computer.

References to the projection domain, as used in the present disclosure, refer to data acquired by an imaging system, e.g. a multi-energy or spectral computed tomography (CT) system, before reconstruction of that data into images (i.e. into images forming spatial representations of the imaged object as opposed to, for example, sinograms). This projection domain data may represent line integrals of object properties (in conjunction with photon properties interacting with the object), e.g. attenuation of photon intensity as accumulated over a line corresponding to the path of the photons from a source, through the object and onto a detector. The image domain, on the other hand, refers to a direct representation of the spatial distribution of the object properties of interest, or values deduced therefrom. The projection data may comprise the measured X-ray intensities or photon counts at detector pixels (or possibly collated values from different pixels corresponding to the same geometric ray through the imaged object in the imaging process) or other values that are calculated independently on a per pixel (or per ray) basis, e.g. representing in some way line integrals of the X-ray attenuation of the object along the geometric ray.

However, the term material path lengths, or material line integrals, refers to line integrals of object properties indicative of specific materials (e.g. calcium, bone, iodine, water, soft tissue, etc.) or of physical effects contributing to the X-ray attenuation (e.g. a photoelectric effect component, a Compton scattering component, etc.), e.g. along a geometric ray corresponding to a geometric ray of the imaging process. Whereas the projection data, as obtained, renders for the same projection ray at least two different values indicative of the X-ray attenuation through an object of interest along the ray for at least two corresponding X-ray spectra, e.g. different energy bins, which typically may involve the effect of passing through a plurality of different materials along the path of the ray, the result of a material decomposition represents this information in a different basis, e.g. decomposes the observed values into contributions from a plurality of different materials of interest forming an idealized basis. In other words, the measured properties along the geometric path for different energy ranges or spectra are explained as (at least approximately) a sum of the effects of different explanatory materials, in which each material is assigned a length (e.g. thickness) of the material to explain the combined effects observed along the ray. Hence these materials (or at least the mathematical representation of their physical properties) are also referred to as base-materials. It is to be noted that these base-materials can, but do not need to, correspond to properties of physical materials (e.g. can also represent idealized physical effects like the Compton effect contribution and/or photoelectric effect contribution).

FIG. 1 shows an illustrative method 1 in accordance with embodiments of the present invention.

The method 1 comprises receiving 2 projection data acquired by an imaging system, e.g. a spectral CT imaging system (e.g. a dual energy CT imaging system or a multi-energy CT imaging system), in which the projection data comprises, for each of a plurality of different projection rays, a plurality of spectral values, e.g. measured line integrals, corresponding to different X-ray spectra. For example, the projection data may comprise or consist of, for each X-ray spectrum, a sinogram (or may equivalently be represented by such sinogram), e.g. a two-dimensional sinogram image of detector pixel readings, in which each image location (sinogram pixel) may correspond to a different geometrical projection ray, and corresponding image locations (sinogram pixels) from different sinograms represent the observed X-ray attenuation for different spectra along the same projection ray. For example, the different spectra may correspond to different energy bins of the output obtained from an energy-resolving detector, e.g. a photon-counting detector.

For example, the projection data may comprise an array $p_{ib}$ of values, e.g. observed X-ray intensity or measured photon counts, as indexed by a spectrum identifier b, e.g. energy bin b, and a geometric ray identifier i, e.g. measurement point i. This array may contain N×B elements, for N measurements and B energy bins or spectra. While the measurements are represented as a vector (per energy bin or spectrum) indexed by i, it is understood that these values may relate as a two-dimensional spatial structure to each other, e.g. could also be represented as a two-dimensional matrix indexed by resp. (for example) a gantry angle (of rotation around a longitudinal axis) and a detector row or longitudinal position along the longitudinal axis.

Receiving 2 the projection data may comprise obtaining the data from the imaging system directly, via an interface of the imaging system, or from a storage, e.g. where the data was stored after being acquired by the imaging system awaiting further processing.

The method comprises reducing 3 noise in the projection data by combining corresponding spectral values for different projection rays. This reducing of noise may comprise a low-pass (spatial) filtering 4, e.g. smoothing, and/or down-sampling 5 of the data. Thus, the projection data $p_{ib}$ are converted to noise-reduced data $p_{ib}^*$. If the projection data are down-sampled, which may be advantageous, the index i may run over less elements (i=1 . . . N') than the index i of the original projection data (i=1 . . . N). However, this is not necessarily the case for all embodiments in accordance with the present invention (e.g. N' may be equal to N).

For example, the step of reducing noise may comprise smoothing 4 the projection data, e.g. for each spectral component (the subset of values for one X-ray spectrum treated separately). Such smoothing may be performed by combining each value with other values (corresponding to the same spectrum) of nearby projection rays, e.g. from nearby detector pixels. For example, the smoothing process may iterate over all pixels, each pixel taking a central place in the smoothing process in turn, in which it is combined with nearby, e.g. neighboring, pixel vales. Such process may for example be implemented efficiently and substantially in parallel by a convolution operation, a spatial frequency domain operation (Fourier filter), and/or other low-pass filtering technique as known in the art.

This combination may be an averaging operation of the central value and its nearby values. For example, the smoothing 4 may be obtained by a boxcar filter. The averaging may also be weighted to give a higher weight to the central value for which the average is calculated, e.g. by using a Gaussian kernel taking the distance to the central detector pixel into account. The smoothing may be performed in one spatial dimension, e.g. the angular domain (e.g. for a helical scan), or in two spatial dimensions, e.g. over gantry angle and longitudinal position. The filter properties are also not necessarily equal for both spatial dimensions, e.g. the width of the boxcar filter may vary for the angular dimension and the longitudinal position dimension, or even different filters may be applied for different spatial dimensions.

The step of reducing the noise may comprise down-sampling 5 of the projection to data, i.e. such that the number of represented projection rays (or number of equivalent detector pixels) is reduced. Such down-sampling can be performed very efficiently, e.g. by averaging each contiguous block of 2×2, 3×3, . . . , m×n (e.g. m and n being non-zero positive integers; m may be equal to n; at least one of m and n is greater than one) of adjacent values (for a same spectrum) into one down-sampled value (e.g. decimating the data). It is to be noted that non-integer (preferably rational) down-sampling factors can also be used. For example, the data may be up-sampled (e.g. by interpolation), optionally further filtered to reduce noise (this may already be inherent to the up-sampling interpolation) and then decimated by an integer factor to achieve an overall rational down-sampling factor.

The down-sampling and smoothing of the data may be combined, e.g. by first convolving with a smoothing kernel (e.g. a Gaussian kernel) and then down-sampling (e.g. decimating) to a lower resolution. It is also noted that such down-sampling with smoothing are not necessarily implemented as two separate (consecutive) steps, e.g. may be performed in a single operation. For example, the down-sampling may comprise reducing high-frequency spatial components with a digital lowpass filter (e.g. an anti-aliasing filter) and decimating the result (or an equivalent implementation).

Noise-reduction, e.g. by down-sampling and/or smoothing, improves the statistics of the data, such that issues like outliers and bias in the results of solving the inherently ill-posed problem of material decomposition are significantly reduced. However, this comes at the cost of a loss of spatial resolution.

The method comprises applying 6 a first projection-domain material decomposition algorithm to the noise-reduced projection data $p_{ib}^*$, e.g. the down-sampled projection data, to obtain a first set of material path length estimates $\hat{l}_{im}$. This material decomposition algorithm may be a decomposition algorithm as known in the art. By using the noise-reduced projection data, the result of this material decomposition algorithm is less affected by noise, outliers and/or regularization bias, at the cost of a lower spatial resolution of the output (and, hence, of images when these would be reconstructed from this output). The lower spatial resolution may be implicit (due to the smoothing operation 4) or explicit (due to down-sampling 5).

In other words, a rough estimate $\hat{l}_{im}$ is calculated of the material path lengths that is only to a minor degree affected by outliers or any bias. Furthermore, when the noise-reduced projection data is down-sampled, the complexity of solving the material decomposition problem to obtain this rough estimate is strongly reduced compared to directly solving the material decomposition problem for the projection data at its original spatial resolution (e.g. N' may be substantially less than N).

The first set of material path length estimates may comprise (or may be represented by) a matrix of decomposed material path lengths $\hat{l}_{im}$, for each noise-reduced, e.g. down-sampled, measurement i (1=1 . . . N') and each base-material m (m=1 . . . M). The material decomposition algorithm may determine for a decomposed material path length $\hat{l}_{im}$ an estimate $\hat{p}^{*}_{ib}(\hat{l}_{im})$ of the corresponding projection data, e.g. estimated photon counts for the material length $\hat{l}_{im}$ along a geometric projection corresponding to the index i. This calculation may thus use a spectral forward model.

The first projection-domain material decomposition algorithm may optimize a cost function, e.g. corresponding to a maximum likelihood estimator, that minimizes a discrepancy between the forward estimate of the data, e.g. the estimated photon counts $\hat{p}^{*}_{ib}(\hat{l}_{im})$, and the observed (noise-reduced and/or down-sampled) data, e.g. the observed (noise-reduced and/or down-sampled) photon count values $p_{ib}$. For example, the cost function may have the form (or a form similar and/or equivalent thereto):

$$L_i = \sum_b \hat{p}^{*}_{ib}(\hat{l}_{im}) - p^{*}_{ib}\log(\hat{p}^{*}_{ib}(\hat{l}_{im})) + \sum_m \beta_m \cdot \hat{l}^2_{im}$$

in which the first term is optimized to take Poisson noise on measured photon count values into account. Such Poisson noise model may be particularly suitable where the step of reducing the noise comprises a summation of neighboring pixel values (photon counts) to denoise and/or down-sample the data. It will be understood that this noise model may be replaced by another suitable noise model, e.g. in case the neighboring pixel values are combined by averaging, by a weighted average, or by another transformation and/or filtering that does not preserve the discrete properties of the underlying photon counting process. It is also to be noted that the form of the error term based on Poisson noise in the equation hereinabove may also be scaled to take a straightforward transformation into account, e.g. when the photon count values p* are obtained by averaging instead of summation.

It is to be noted that alternative formulations of this first term are not excluded, e.g. using a different noise model. For example, this term may alternatively be expressed as an absolute difference or a squared difference, e.g. $\Sigma_b|\hat{p}_{ib}(l_{im})-p_{ib}|$ or $\Sigma_b(\hat{p}_{ib}(l_{im})-p_{ib})^2$, for example if the fluence is sufficiently high to neglect the Poisson noise statistics (or a suitable variance stabilization method is first applied) or the measurements are not obtained by a photon-counting detector (e.g. using a kVp switching in combination with a conventional detector). Another example is a weighted sum of squares, in which the weights of the squared errors represent the variance of the data. This cost function may be minimized per measurement i to estimate the material lengths $\hat{l}_{im}$ (e.g. iteratively optimizing these lengths) that optimally fit to the noise-reduced values $p_{ib}^{*}$. Note that $\hat{l}_{im}$ is used to refer to both the parameter in this optimization and the result thereof, for the sake of not overcomplicating the notation.

The second term represents an optional Tikhonov regularization term, in which the regularization strength parameters $\beta_m$ may be predetermined (or obtained by an algorithm as known in the art), e.g. defined per material to balance the influence of the regularization on materials with very different expected physical path lengths (e.g. water and iodine). Embodiments where the strength parameters are replaced by a single parameter $\beta$ i.e. is set equal for all considered base-materials, are not necessarily excluded. If this material decomposition were to be applied to very noise data, solutions with small values of the squared sum of weighted material path length values $l_{im}$ would be preferred by the regularizer (second term), leading to a regularization-induced bias.

However, since the first material decomposition algorithm is applied to noise-reduced data, e.g. down-sampled data, this regularization-induced bias and potential outliers in the results are reduced. Furthermore, in embodiments of the present invention, the Tikhonov regularization term may even be (optionally) neglected, or applied with a relatively low strength $\beta_m$ (possibly a same strength for all materials). Particularly, the cost function may be as simple as $L_i=\Sigma_b\hat{p}_{ib}^{*}(\hat{l}_{im})-p_{ib}^{*}\log(\hat{p}^{*}_{ib}(\hat{l}_{im}))$, or alternatives thereof (e.g. using a different noise model).

The method comprises applying 7 a second projection-domain material decomposition algorithm to the projection data $p_{ib}$, e.g. the original projection data to which the noise-reduction step was not applied, to obtain a second set of material path length estimates $l_m$.

Similarly to the illustrative first projection-domain material decomposition algorithm, the second projection-domain material decomposition algorithm may optimize a cost function, e.g. corresponding to a maximum likelihood estimator, that minimizes a discrepancy between a forward estimate of the data, e.g. estimated photon counts $\hat{p}_{ib}(l_{im})$, and the observed data (without noise-reduction and/or down-sampling), e.g. the observed photon count values $p_{ib}$. For example, the cost function may have the form (or a form similar and/or equivalent thereto):

$$L'_i = \sum_b \hat{p}_{ib}(l_{im}) - p_{ib}\log(\hat{p}_{ib}(l_{im})) + \sum_m \beta_m \cdot (l_{im} - \hat{l}_{im})^2$$

It is to be noted that such cost function minimization problem could equivalently be formulated as a maximization of an equivalent problem, or that the cost (or objective) function can be transformed such to obtain its minimum (or maximum) in the same point in the solution space. It will be understood that such transformations of the problem are considered irrelevant and insubstantial, and are therefore considered to be equally covered by embodiments of the present invention. This obviously also applies to the cost function previously discussed hereinabove in relation to the first projection-domain material decomposition.

This illustrative cost function may be minimized per measurement i to estimate the material lengths $l_{im}$, (e.g. iteratively optimizing these lengths) that optimally fit to the measured values $p_{ib}$. The second projection-domain material decomposition algorithm may comprise, as discussed hereinabove, a forward calculation of $\hat{p}_{ib}(l_{im})$, e.g. by simulating transport of the photons with the spectrum b (e.g. energy bin) through the base-material m over a material length $l_{im}$. It is again noted that $l_{im}$ is used to denote both the optimization parameter and the result of the optimization, for the sake of not overcomplicating the notation, which uses can be clearly distinguished from the context.

The first term of this cost function is similar to the first term of the cost function $L_i$ of the first illustrative material decomposition discussed hereinabove, and may equally be replaced by an alternative expression indicative of a suitable discrepancy or deviation between the observed and inferred (forward estimate) data.

However, the second term may be a modified alternative of the Tikhonov regularization term, which can be referred to as a guided Tikhonov regularization. This modified Tikhonov regularization does not penalize the squared values of the material path length $l_{im}$, but rather the squared difference $l_{im}-\hat{l}_{im}$ of the material path length and the rough estimate thereof obtained by the first material decomposition algorithm. Thus, systematically lower values of the estimated path lengths are avoided, and, ideally, no regularization-induced bias should be observed. In other words, an initial rough estimate of the material path length $\hat{l}_{im}$ makes it possible to reduce the risk of regularization-induced bias by guiding the Tikhonov regularization with this rough estimate.

The second term may be a further generalization of the guided Tikhonov regularization, e.g. as indicated in the following:

$$L'_i = \sum_b \hat{p}_{ib}(l_{im}) - p_{ib}\log(\hat{p}_{ib}(l_{im})) + \sum_m \beta_m \cdot |l_{im} - \hat{l}_{im}|^n$$

with n being a non-zero parameter, e.g. an integer or real number (and $n>=1$). A high value of n (e.g. at least 4, e.g. 4) will strongly reduce the difference between the estimated $l_{im}$ and the initial estimates $\hat{l}_{im}$ when this difference is large, but to a lesser degree for smaller deviations. This may be preferable in case the initial estimate is expected to be already sufficiently close to the ground truth. Regarding the first term in the equation hereinabove, it is again noted that this may be replaced by another suitable alternative.

Generally, the second projection-domain material decomposition algorithm comprises an optimization that penalizes a deviation (e.g. the second term in the illustrative equation hereinabove) between the second set of material path length estimates $l_{im}$ and the first set of material path length estimates $\hat{l}_{im}$. Clearly, as known for material decomposition algorithms, this optimization may also (e.g. concomitantly) optimize a deviation (or, generally speaking, a discrepancy, e.g. the first term in the illustrative equation hereinabove) between the projection data $p_{ib}$ and a forward estimate $\hat{p}_{ib}$ of the projection data based on the second set of material path length estimates $l_{im}$. The deviation between the first and second sets of material path length estimates may take the form of the guided Tikhonov regularization term discussed hereinabove, but may equally be formulated in an alternative manner, e.g. as an $L_1$ norm (absolute value of the difference) or other suitable formulation that reaches a (preferably unique) minimum where both path length estimates coincide.

As can be seen, the guided Tikhonov regularization term (or alternative formulation thereof, or generalization thereof) prefers solutions which are close to the rough estimate. Even if the rough estimate is not completely correct, a better solution can likely be obtained than assuming zero as the initial estimate, as is the case for a conventional Tikhonov regularization.

The method may further comprise outputting 8 the second set of material path length estimates $l_{im}$ as a result of the material decomposition.

The method may comprise 9 up-sampling the first set of path length estimates $\hat{l}_{im}$ to the same resolution as the original data (e.g. $l=1 \ldots N$) before usage in the second material decomposition algorithm. This can be as simple as repeating the data points to provide the equivalent of a nearest neighbor interpolation, or may comprise a more complicated interpolation algorithm, e.g. linear interpolation, quadratic interpolation, spline interpolation, etc. It will also be understood that this up-sampling may not be necessary (e.g. where the data were smoothed but not down-sampled), or can be performed implicitly (e.g. by directly inserting the nearest neighbor or other interpolation in a practical implementation of the cost function of the second material decomposition algorithm).

It will also be understood that a method as described hereinabove may comprise multiple noise reduction steps, e.g. with different degrees of smoothing and/or down-sampling. For example, the method 1 may comprise at least one further step of reducing 13 noise in the projection data by combining corresponding spectral values for different projection rays to obtain at least one further set of noise-reduced projection data. The level of noise reduction of this further step of reducing 13 noise may be stronger than the aforementioned step of noise reduction 3, e.g. may comprise a further down-sampling to even lower spatial resolution. The examples and optional features discussed hereinabove relating to the first step of reducing noise 3 may equally relate to the one or more steps of further noise reduction 13.

Likewise, the method 1 may comprise at least one further step of applying 16 a further projection-domain material decomposition algorithm to the at least one further set of noise-reduced projection data to obtain at least one further set of material path length estimates.

The aforementioned step of applying 6 the first projection-domain material decomposition algorithm may comprise an optimization that penalizes a deviation between the first set of material path length estimates being optimized and the further set of material path length estimates. In other words, it may be similar or equal to the step of applying 7 the second projection-domain material decomposition, except for obvious changes in the input (and possibly different parameter selections). The examples and optional features discussed hereinabove relating to the step of applying 7 the second projection-domain material decomposition may thus equally relate to the step of applying 6 the first projection-domain material decomposition. It will also be understood that this may also involve an implicit or explicit up-sampling of the further set material path length estimates to be used in the applying 6 the first projection-domain material composition, e.g. cf. step 9.

In other words, an approach similar to a multi-resolution pyramid may be implemented in a method in accordance with embodiments of the present invention, in which the initial projection data is first severely down-sampled and/or smoothed to obtain a very rough estimate of the material path lengths, which are used to guide the regularization of a second stage performed on less down-sampled and/or smoothed projection data, the results of which are again used in a next stage to guide the regularization until at this stage, or a further stage along the flow, the initial unsmoothed projection data at its original spatial resolution are processed.

In a second aspect, the present invention relates to a projection data processing device for material decomposition of spectral imaging projection data.

Figure 2:
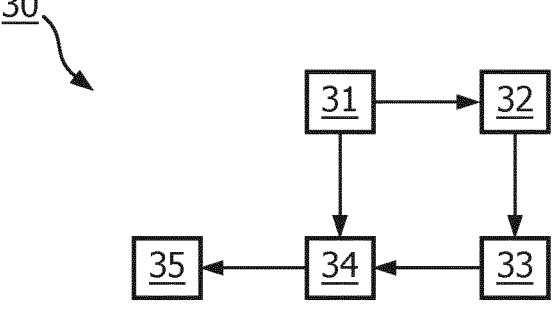
FIG. 2 shows a device in accordance with embodiments of the present invention.

FIG. 2 shows an illustrative device 30 in accordance with embodiments of the present invention. The device may comprise a processor, e.g. a computer system, configured with typical support hardware, e.g. a memory, input/output interfaces, a user interface, and the like. Such processor, e.g. computer, may comprise computer-readable instructions, e.g. stored in a memory, to execute a method in accordance with embodiments. The processor may be a generic processor, e.g. a microprocessor as typically included in a computer system (which may also include a plurality of processors, a cloud computing platform, a computing cluster, and the like), but may also comprise hardware that is specifically designed or configured for the stated purpose, e.g. an application specific integrated circuit (ASIC), a field-programmable gate array (FPGA), etc.

The device 30 comprises an input 31 for receiving the projection data acquired by a spectral imaging system, e.g. by a spectral (e.g. dual-energy or multi-energy) CT system. The device 30 comprises a noise reducer 32 (e.g. implemented by the processor) for reducing noise in the projection data by combining corresponding spectral values for different projection rays to obtain noise-reduced projection data, The device 30 comprises a first optimizer 33 (e.g. implemented by the processor) to apply a first projection-domain material decomposition algorithm to the noise-reduced projection data and thus obtain a first set of material path length estimates.

The device 30 comprises a second optimizer 34 (e.g. implemented by the processor) to apply a second projection-domain material decomposition algorithm to the projection data to obtain a second set of material path length estimates, in which the second projection-domain material decomposition algorithm comprises an optimization that penalizes a deviation between the second set of material path length estimates being optimized and the first set of material path length estimates.

The device 30 may comprise an output 35 to output the second set of material path length estimates.

Other features, or details of the features described hereinabove, of a device in accordance with embodiments of the present invention shall be clear in view of the description provided hereinabove relating to a method in accordance with embodiments of the present invention. Particularly, the device 30 may be adapted to perform a method in accordance with embodiments of the present invention.

Figure 3:
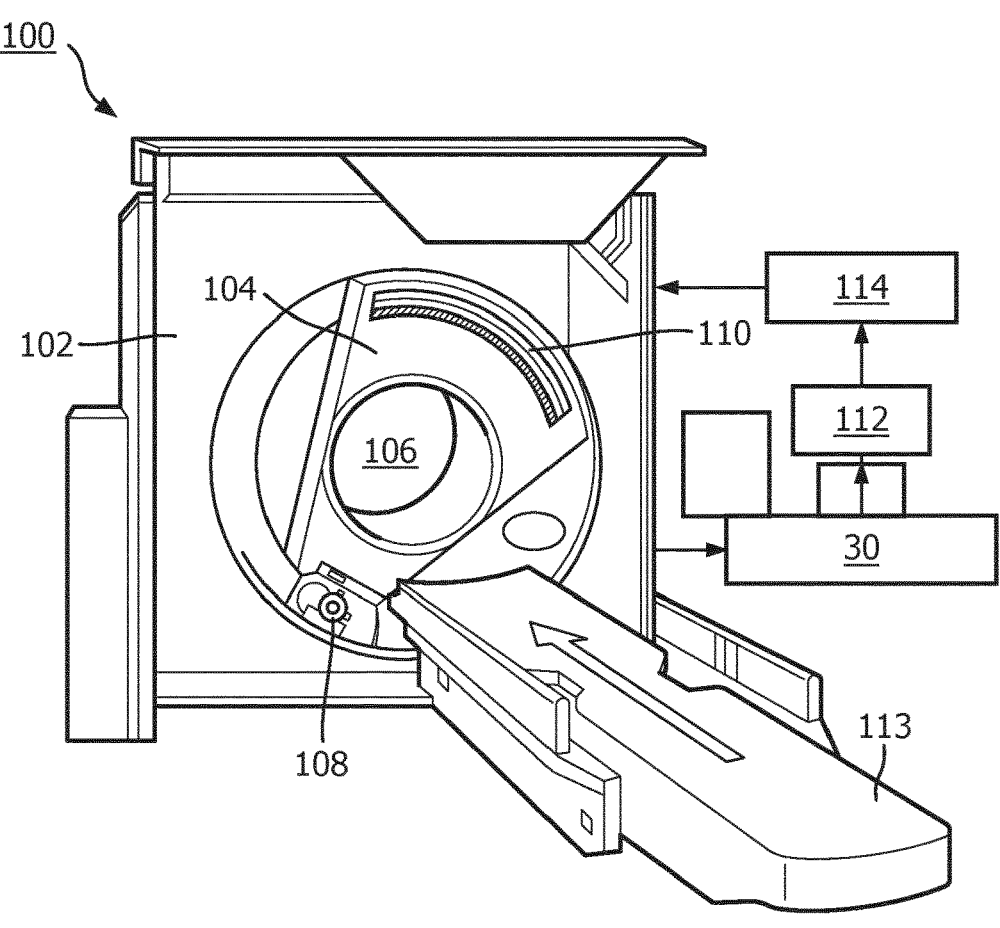
FIG. 3 shows a system in accordance with embodiments of the present invention.

In a third aspect, the present invention relates to a spectral computed tomography imaging system. FIG. 3 illustrates an exemplary spectral computed tomography imaging system 100 (e.g. a spectral CT scanner) in accordance with embodiments of the present invention.

The imaging system 100 may comprise a generally stationary gantry 102 and a rotating (rotatable) gantry 104. The rotating gantry 104 may be rotatably supported by the stationary gantry 102 and may (in use of the system) rotate around an examination region 106 about a longitudinal axis Z.

A radiation source 108, such as an X-ray tube, may be rotatably supported by the rotating gantry 104, e.g. such as to rotate with this rotating gantry 104, and may be adapted for emitting X-ray radiation that traverses the examination region 106. The radiation source 108 may comprise, or consist of, at least one X-ray tube.

The system may also comprise a radiation image detector 110. The radiation image detector 110 may comprise a radiation sensitive detector array that subtends an angular arc opposite the radiation source 108 across the examination region 106. The image detector 110 may include a plurality of rows of detector elements arranged with respect to each other along the Z-axis direction. The image detector 110 may be adapted for detecting radiation traversing the examination region 106, and generating signals indicative thereof, e.g. indicative of the intensity of received radiation as function of the location of detection on the array.

The image detector may be adapted to distinguish incident radiation as dependent on its energy, e.g. a dual-energy detector or spectral detector. The image detector may comprise a photon-counting (energy-resolving) image detector. The radiation image detector may, for example, comprise one or more scintillators and a plurality of photosensors, a direct conversion detector or another type of radiation image detector as known in the art. Alternatively or additionally, the system may comprise a plurality of radiation sources, e.g. X-ray tubes, to emit photons in accordance with different spectra, and/or the radiation source may be adapted to (preferably rapidly) switch between different energy spectra.

The system comprises a material decomposition processor to process (e.g. raw) projection data acquired from the image detector into separate components indicative of different materials and/or physical effects, e.g. the material path lengths discussed hereinabove. Particularly, the CT system comprises a device 30 in accordance with embodiments of the second aspect of the present invention.

The CT system, as is known in the art, may comprise a reconstructor 112 for reconstructing the signals provided by the image detector 110. The reconstructor may be adapted to generate reconstructed tomographic images, e.g. showing transverse slices. The device 30 may be integrated in, or operably connected to, the reconstructor 112. The system may comprise a subject support 113, such as a couch, for supporting an object or subject in the examination region. The subject support 113 may comprise one or more actuators to move the support, and the subject supported thereon, to a selectable and/or controllable position, e.g. such as to move a selectable part of the subject into the examination region. Furthermore, the actuator or actuators may be adapted for moving, continuously or in steps, the subject through the examination region such as to scan (i.e. image) the subject over a length in the longitudinal direction Z that is greater than the length of the examination region as such, i.e. greater than the length of the detector (as determined by the number of detector rows and element size).

The system may also comprise an operator console 114, e.g. a general-purpose computer that is specifically programmed and/or configured for controlling or monitoring the system 100 and/or for providing a user interface to an operator. The console 114 may include a human readable output device such as a monitor or display and an input device such as a keyboard and mouse. Software resident on the console 114 may allow the operator to interact with the scanner 100 via a graphical user interface (GUI) or otherwise.

The imaging system 100 may be operably connected to a workstation, such as a computer, that may comprise an input/output (I/O) interface for facilitating communication with the CT scanner. The computing system may comprise an output device. The output device or output devices may comprise, for example, a display monitor, a film printer, a paper printer and/or an audio output for audio feedback. The computing system may also comprise an input device or input devices, such as a mouse, a keyboard, a touch interface and/or a voice recognition interface. The computing system may also comprise at least one processor, such as a central processing unit (CPU), a microprocessor, a dedicated application-specific integrated circuit (ASIC) for processing and/or an appropriately configured programmable hardware processor such as a field-programmable gate array. The computing system may comprise a computer readable storage medium, e.g. a non-transitory memory such as a physical digital memory. The computer readable storage medium may store computer readable instructions and data. The at least one processor may be adapted for executing the computer readable instructions. The at least one processor may also execute computer readable instructions carried by a signal, carrier wave or other transitory medium. Alternatively or additionally, the at least one processor may be physically configured to embody the instructions, e.g. entirely or in part, without necessarily requiring memory storage of these instructions, e.g. by configuration of a field-programmable gate array or an ASIC specifically designed to carry out at least a part of the instructions.

The computing system may be comprised in the imaging system or may be external to it. The reconstructor 112 may be integrated in the computing system or may be embodied in a separate computing and/or processing device. The console 114 may be integrated in the computing system or may be embodied in a separate computing and/or processing device.

In a fourth aspect, the present invention relates to a computer-program product comprising computer-executable instructions, which, when executed on a programmable device, performs a method in accordance with embodiments of the first aspect of the present invention.

Figure 4:
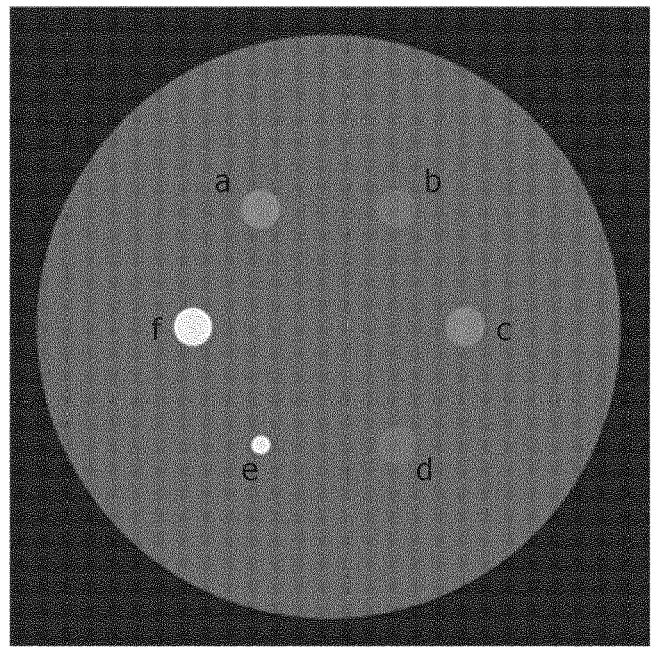
FIG. 4 illustrates a phantom used in simulations demonstrating aspects and advantages of embodiments in accordance with the present invention.

As an example of the advantages of an approach as discussed hereinabove, e.g. a guided Tikhonov regularization, is illustrated hereinbelow based on simulated data. FIG. 4 illustrates a phantom that is used for these simulations, which consists of a cylindrical water phantom with cylindrical inserts comprising iodine, gadolinium, and bone. The indicated inserts are: a) 12 mg/ml Gd, b) 4 mg/ml Gd, c) 7.5 mg/ml I, d) 2.5 mg/ml I, e) bone and f) bone.

Figures 5, 6:
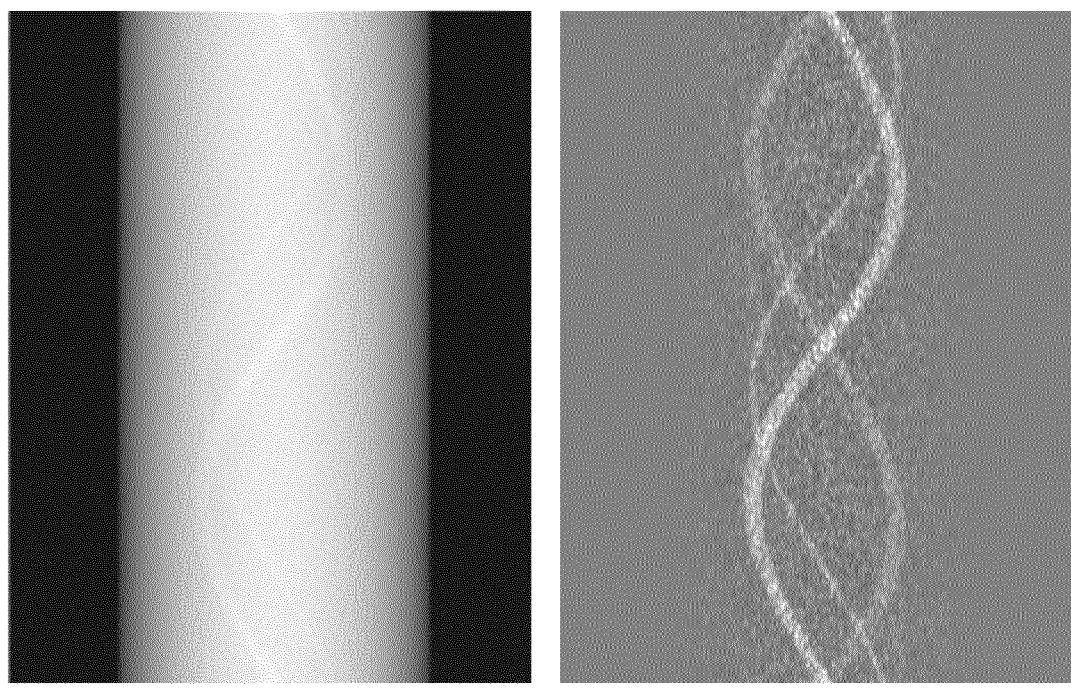
FIG. 5-7 show roughly estimated material path length values as determined from strongly smoothed photon counting sinograms, for respectively the water, iodine and gadolinium base-materials, illustrating aspects of embodiments of the present invention.
Figure 7:
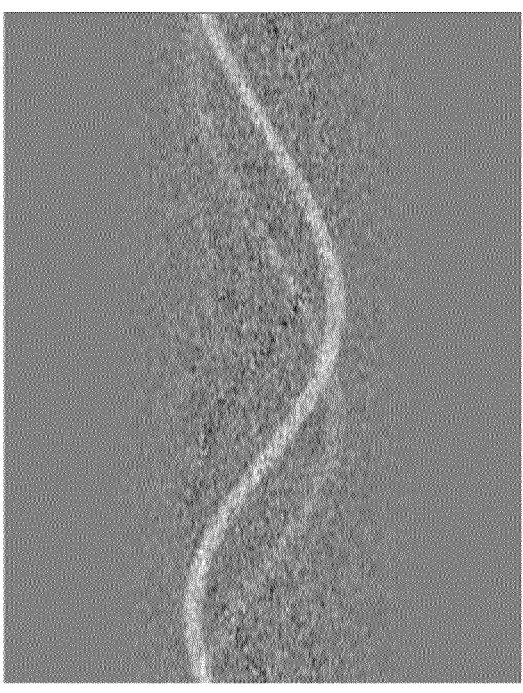

Noisy photon counting data were simulated for this phantom. The rough estimates T im are determined by first strongly smoothing the original count sinograms with a boxcar filter, and then performing a conventional material decomposition on the smoothed data without any regularization (in this example, a water/iodine/gadolinium basis for decomposition was used). These rough estimates are illustrated in FIGS. 5, 6 and 7, for respectively the water, the iodine and the gadolinium base-material. Many other ways of calculating the rough estimates are however conceivable, e.g. doing decomposition only on a strongly down-sampled sinogram, followed by an up-sampling to the full sampling, or direct usage of the down-sampled rough estimate in the cost-function (which may, for example, correspond to nearest neighbor up-sampling).

Figure 8:
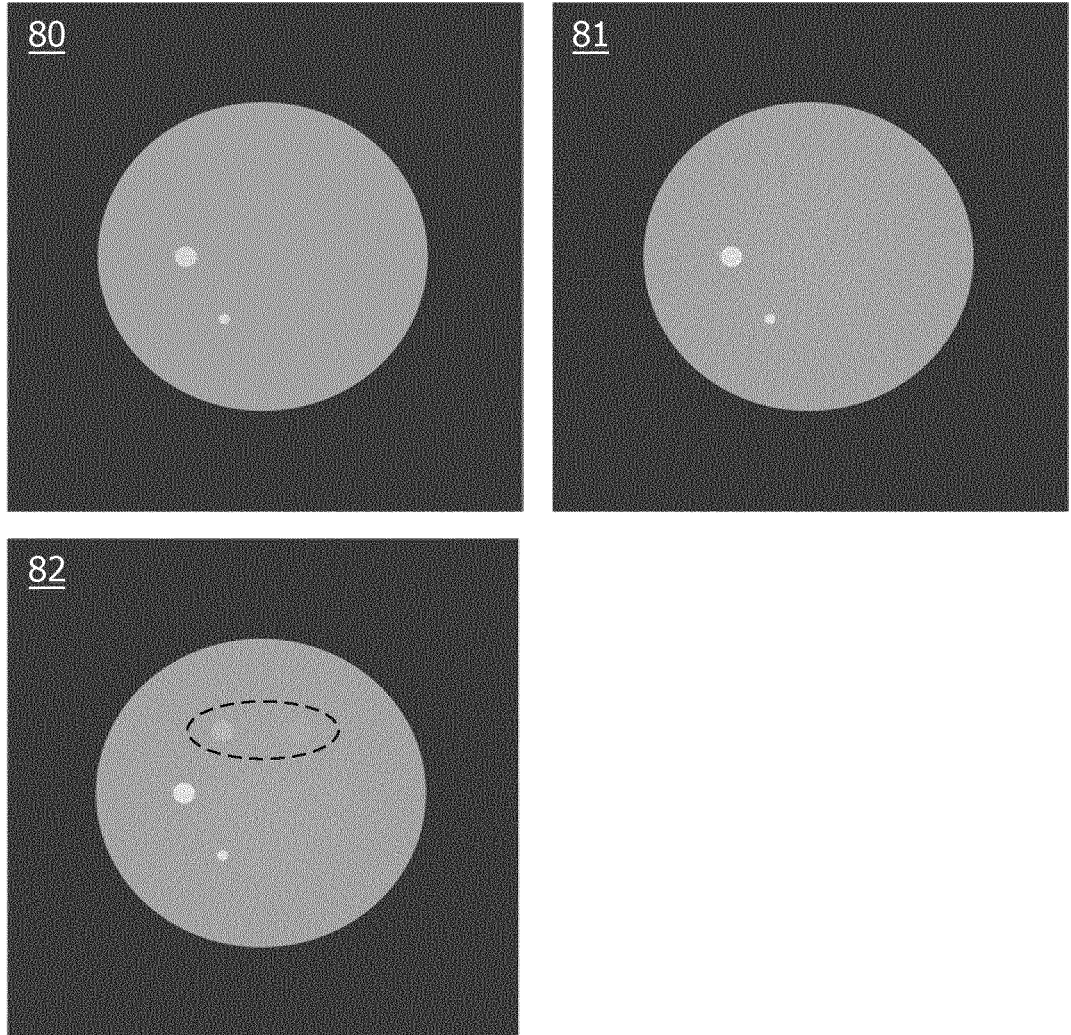
FIG. 8-10 show reconstructed material images, for respectively water (FIG. 8), iodine (FIG. 9) and gadolinium (FIG. 10), as reconstructed from material sinograms decomposed with a conventional Tikhonov regularization as well as a guided Tikhonov regularization (in accordance with embodiments of the present invention), together with the corresponding ground truth image, to illustrate aspects of embodiments of the present invention.
Figure 9:
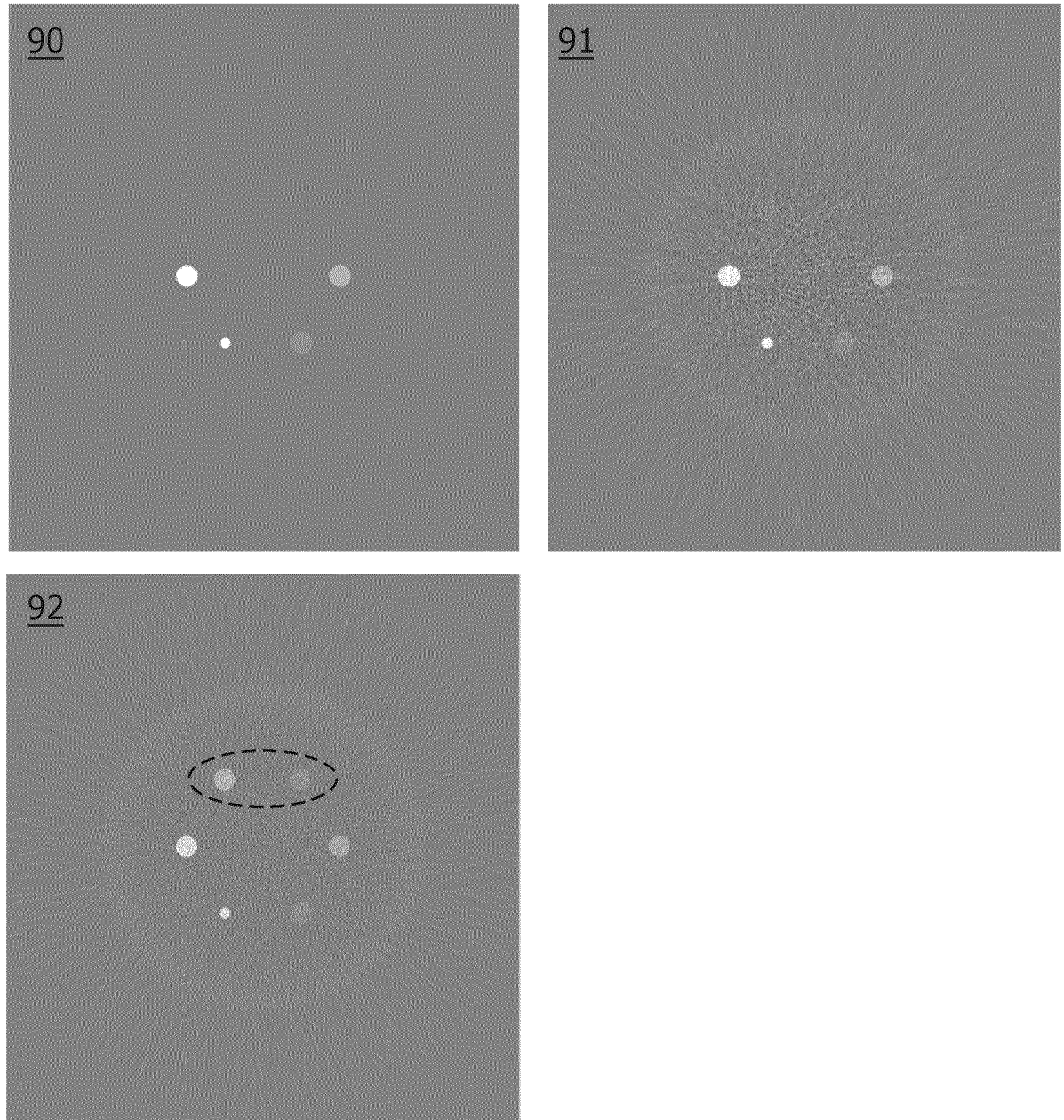
Figure 10:
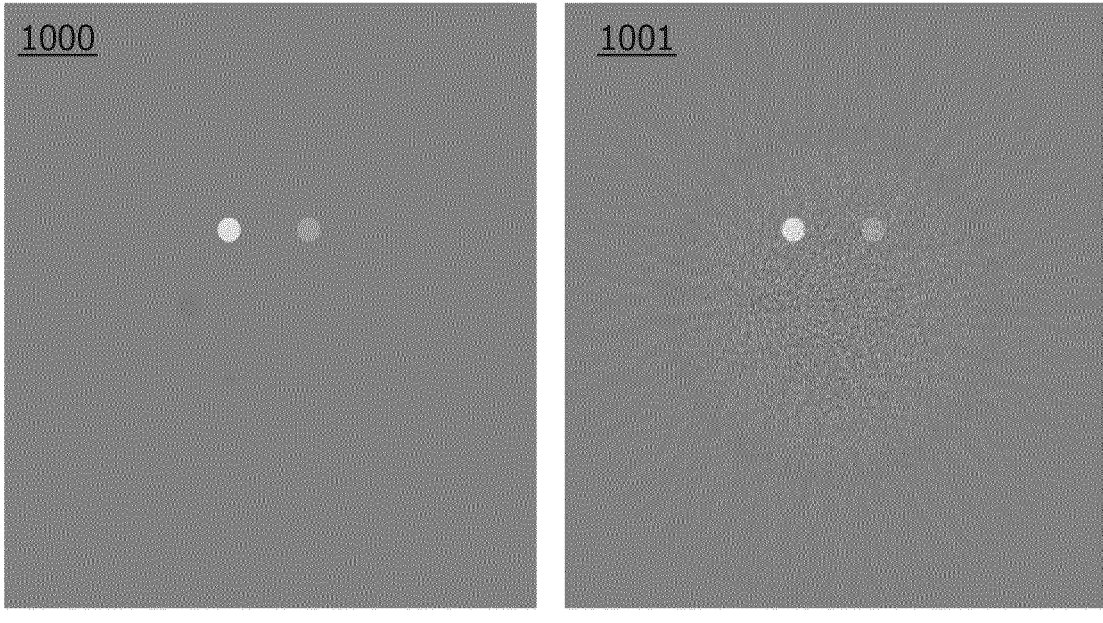
Figure 10:
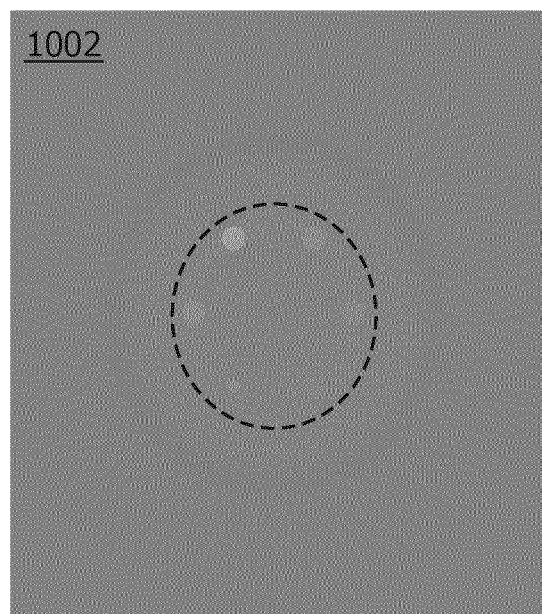

FIGS. 8, 9 and 10 show final material images, for respectively water (FIG. 8), iodine (FIG. 9) and gadolinium (FIG. 10), reconstructed from material sinograms decomposed with conventional Tikhonov regularization 82, 92, 1002 and with the guided Tikhonov regularization 81, 91, 1001, in accordance with embodiments of the present invention, together with the ground truth 80, 90, 1000 for these images. As can be seen, substantial differences with respect to the ground truth are observed for a conventional Tikhonov regularization in the water and iodine images at the locations of the gadolinium inserts (see ellipses in FIGS. 8 and 9), and at the locations of substantially all inserts in the gadolinium image (see circle in the FIG. 10). These differences appear to be at least partly caused by the regularization-induced bias. Consequently, for the guided Tikhonov regularization, in accordance with embodiments of the present invention, the material images are much closer to the ground truth in all cases, thereby substantially solving, or at least alleviating, the issue of regularization-induced bias.

Notwithstanding the exemplary embodiments described hereinbelow, is the present invention only limited by the attached claims. The attached claims are hereby explicitly incorporated in this detailed description, in which each claim, and each combination of claims as allowed for by the dependency structure defined by the claims, forms a separate embodiment of the present invention.

The word "comprise," as used in the claims, is not limited to the features, elements or steps as described thereafter, and does not exclude additional features, elements or steps. This therefore specifies the presence of the mentioned features without excluding a further presence or addition of one or more features.

In this detailed description, various specific details are presented. Embodiments of the present invention can be carried out without these specific details. Furthermore, well-known features, elements and/or steps are not necessarily described in detail for the sake of clarity and conciseness of the present disclosure.

The invention claimed is:

1. A computer-implemented method for material decomposition of spectral imaging projection data, comprising:
   receiving projection data acquired by a spectral imaging system;
   reducing noise in the projection data by combining corresponding spectral values for different projection rays to obtain noise-reduced projection data;
   applying a first projection-domain material decomposition algorithm to the noise-reduced projection data to obtain a first set of material path length estimates; and
   applying a second projection-domain material decomposition algorithm to the projection data to obtain a second set of material path length estimates, wherein the second projection-domain material decomposition algorithm comprises an optimization that penalizes a deviation between the second set of material path length estimates being optimized and the first set of material path length estimates.

2. The method of claim 1, wherein the first projection-domain material decomposition algorithm comprises an optimization that minimizes a deviation between the noise-reduced projection data and a forward estimate thereof based on the first set of material path length estimates being optimized.

3. The method of claim 2, wherein the optimization of the first projection-domain material decomposition algorithm further comprises a Tikhonov regularization of the first set of material path length estimates being optimized.

4. The method of claim 1, wherein the optimization of the second projection-domain material decomposition algorithm minimizes a deviation between the projection data and a forward estimate thereof based on the second set of material path length estimates being optimized.

5. The method of claim 1, wherein said penalization in the optimization of the second projection-domain material decomposition algorithm comprises a modified Tikhonov regularization of the form $\Sigma_m \beta_m \cdot |l_{im} - \hat{l}_{im}|^n$, where m iterates over the number of base-materials of the material decomposition, $\beta_m$ refers to predetermined weight parameters assigned to the respective base-materials, i identifies the projection ray for which the material decomposition is being determined by the optimization, $l_{im}$ refers to the material path length of the i'th projection ray and the m'th base-material in the second set of material path length estimates being optimized, $\hat{l}_{im}$ refers to the material path length of the i'th projection ray and the m'th base-material as determined by the first set of material path length estimates and n is a predetermined non-zero parameter.

6. The method of claim 5, wherein n is a real number or integer, and is greater than or equal to 1.

7. The method of claim 5, wherein a cost function of the optimization of the second projection-domain material decomposition algorithm has the form $\Sigma_b\hat{p}_{ib}(l_{im})-p_{ib} \log(\hat{p}_{ib}(l_{im}))+\Sigma_m\beta_m\cdot|l_{im}-\hat{l}_{im}|^n$, in which pus refers to the projection data of the i'th projection ray and the b'th spectrum or energy bin and $\hat{p}_{ib}(l_{im})$ to a corresponding forward estimate thereof based on the second set of material path length estimates being optimized.

8. The method of claim 1, wherein reducing the noise comprises low-pass spatial filtering and/or smoothing the projection data.

9. The method of claim 8, wherein low-pass spatial filtering and/or smoothing the projection data comprises applying a boxcar filter.

10. The method of claim 1, wherein reducing the noise comprises down-sampling the projection data.

11. The method of claim 10, comprising up-sampling and/or interpolating the first set of path length estimates to the same spatial resolution as the projection data for use in the second material decomposition algorithm.

12. The method of claim 1, further comprising reducing noise in the projection data by combining corresponding spectral values for different projection rays to obtain further noise-reduced projection data, and applying a further projection-domain material decomposition algorithm to the further noise-reduced projection data to obtain a further set of material path length estimates, wherein the first projection-domain material decomposition algorithm comprises an optimization that penalizes a deviation between the first set of material path length estimates being optimized and the further set of material path length estimates.

13. A projection data processing device for material decomposition of spectral imaging projection data, comprising:

an input for receiving the projection data acquired by a spectral imaging system, a noise reducer for reducing noise in the projection data by combining corresponding spectral values for different projection rays to obtain noise-reduced projection data;

a first optimizer to apply a first projection-domain material decomposition algorithm to the noise-reduced projection data and thus obtain a first set of material path length estimates; and a second optimizer to apply a second projection-domain material decomposition algorithm to the projection data to obtain a second set of material path length estimates, wherein the second projection-domain material decomposition algorithm comprises an optimization that penalizes a deviation between the second set of material path length estimates being optimized and the first set of material path length estimates.

14. A non-transitory computer-readable medium for storing executable instructions, which cause a method to be performed for material decomposition of spectral imaging projection data, the method comprising:

receiving projection data acquired by a spectral imaging system;

reducing noise in the projection data by combining corresponding spectral values for different projection rays to obtain noise-reduced projection data;

applying a first projection-domain material decomposition algorithm to the noise-reduced projection data to obtain a first set of material path length estimates; and applying a second projection-domain material decomposition algorithm to the projection data to obtain a second set of material path length estimates, wherein the second projection-domain material decomposition algorithm comprises an optimization that penalizes a deviation between the second set of material path length estimates being optimized and the first set of material path length estimates.

* * * * *